US005962813A

United States Patent [19]

Shirako et al.

[11] Patent Number: 5,962,813

[45] Date of Patent: Oct. 5, 1999

[54] CONNECTION STRUCTURE OF FLAT CABLE TO TERMINALS

[75] Inventors: Ichiro Shirako; Kenichi Saiso; Akihiro Sugino, all of Miyagi-ken, Japan

[73] Assignee: Alps Electric Co., Ltd., Tokyo, Japan

[21] Appl. No.: 08/957,227

[22] Filed: Oct. 24, 1997

[30] Foreign Application Priority Data

Oct. 25, 1996 [JP] Japan .................................... 8-301193

[51] Int. Cl.[6] ........................... H02G 15/02; H02R 35/04

[52] U.S. Cl. .................................... 174/88 R; 174/117 F; 439/15

[58] Field of Search ................................ 174/74 R, 84 R, 174/117 F, 117 FF, 88 R; 439/15, 67, 164, 492, 495

[56] References Cited

U.S. PATENT DOCUMENTS 4,635,359 1/1987 Nozick .......................... 174/117 FF X
5,147,510 9/1992 Iura et al. ............................ 174/117 F
5,230,713 7/1993 Schauer ..................................... 29/856
5,348,490 9/1994 Schauer et al. ......................... 439/164
5,356,308 10/1994 Toba et al. .............................. 439/495
5,383,788 1/1995 Spencer ..................................... 439/67
5,683,259 11/1997 Sato ......................................... 439/164
5,685,728 11/1997 Okuhara et al. ........................ 439/164

*Primary Examiner*—Kristine Kincaid
*Assistant Examiner*—Chau N. Nguyen
*Attorney, Agent, or Firm*—Brinks Hofer Gilson & Lione

[57] ABSTRACT

In a connection structure of a flat cable to terminals of the present invention, the conductors held by the back film of the flat cable are ultrasonic welded to the terminals of an external part. In this arrangement, even if the conductors are formed to a very thin thickness, since they are neither twisted nor separated from each other, solid-state welding can be made to target positions.

4 Claims, 6 Drawing Sheets

CONNECTION STRUCTURE OF FLAT CABLE TO TERMINALS

BACKGROUND OF THE INVENTION

1. Filed of the Invention

The present invention relates to a connection structure for connecting the conductors of a flat cable to the terminals of a mating part (external part).

2. Description of the Related Art

FIG. 7 is a plan view showing a conventional flat cable and FIG. 8 is a plan view showing the portion where the conventional flat cable, a conventional lead block and conventional lead wires are connected, the flat cable 13 being a band-shaped member which carries conductors 15 composed of a copper foil or the like on an insulating base film 14 composed of polyethylene terephthalate (hereinafter referred to as PET) or the like with the conductors 15 partly exposed from an end of the base film 14. For example, as shown in FIG. 9, in a rotary connector 16 used as the conductor means of an airbag circuit mounted on an automobile, a flat cable 13 is accommodated in a pair of first and second housings 17, 18 which are rotatably connected to each other. Although both the ends of the flat cable 13 are directly or indirectly taken out to the outside of the housings 17, 18 by being made perpendicular to the lengthwise direction of the flat cable 13, there is known a connection structure for connecting the conductors 15 of the flat cable 13 to external lead wires 20 through the terminals 21 of a lead block 19 (refer to FIG. 8) as the latter indirectly taking-out means.

There has been conventionally proposed a method of connecting the conductors 15 of the flat cable 13 to the terminals 21 of the lead block 19 using ultrasonic welding.

The connecting method using the ultrasonic welding is arranged such that the terminals 21 of the lead block 19 and the conductors 15 of the flat cable 13 are placed on the anvil of an ultrasonic welder and ultrasonic vibration is applied to the portions where the terminals 21 overlap the conductors 15 in the state that the portions are pressed by a horn to thereby cause solid-state welding to the portions where the terminals 21 are connected to the conductors 15. This method has advantages such as a connecting job is simple and a working time can be shortened as compared with other connecting methods such as soldering, spot welding, etc. because a plurality of sets of the terminals 21 and the conductors 15 can be connected to the conductors 15 at a time.

Further, when the conductors 15 of the flat cable 13 are connected to the terminals 21 of the lead block 19, it is necessary to correctly determine the mutual positions of the conductors 15 and the terminals 21.

For this purpose, as shown in FIG. 7, there are conventionally formed a pair of cutout portions 14*a*, 14*a* on the side edges of the base film 14 in the vicinity of an end thereof using the positions of the conductors 15 exposed by themselves as a reference. This is because that the distances from the side edges of the base film 14 to the conductors 15 are inevitably dispersed in manufacture and the side edges of the base film 14 cannot be directly used as the reference. On the other hand, as shown in FIG. 8, a pair of projections 19*a*, 19*a* which correspond to the pair of cutout portions 14*a*, 14*a* are disposed upward to the exterior package of the main body of the lead block 19. The pair of cutout portions 14*a*, 14*a* of the flat cable 13 are engaged with the pair of projections 19*a*, 19*a* of the lead block 19 to thereby correctly determine the mutual positions of the terminals 21 of the lead block 19 and the conductors 15 of the flat cable 13.

Incidentally, there is recently a tendency that the conductor 15 of the flat cable 13 is made thinner and there appears the flat cable 13 having the conductor 15 formed to a very thin thickness of, for example, about 32 $\mu$m. When the thin conductor 15 is placed on an ultrasonic welder for ultrasonic welding, since the strength thereof is not sufficient due to its thin thickness, the conductor 15 is liable to be twisted and a plurality of the conductors 15 are liable to be separated, whereby the press force of the horn does not uniformly act on the portions where the terminals 21 are connected to the conductors 15, the mutual positions of the terminals 21 and the conductors 15 are displace and the solid-state welding is not made to target positions.

In particular, when the plurality of conductors 15 of the flat cable 13 are simultaneously ultrasonic welded to the respective terminals 21 of the lead block 19 which correspond to the conductors 15, since the conductors 15 are separated, there is a problem that the determination of the positions of the respective conductors 15 to the terminals 21 becomes difficult and the connected states of the respective sets of the conductors 15 and the terminals 21 are liable to be dispersed and thus all the sets of them cannot be securely connected.

When the ultrasonic welding is executed, there is caused a phenomenon of so-called "scatter of metal" that the metal (copper foil piece) of the plurality of conductors 15 of the flat cable 13 is melted therefrom by ultrasonic vibration and scattered to the outside of the conductors 15. When metal particles are scattered to the outside of the conductors 15 by the phenomenon of the scatter of metal, there is a problem that the plurality of conductors 15 may be electrically short-circuited, whereby the reliability of the connected portions is made insufficient and further a desired electric performance cannot be obtained.

Further, when the plurality of conductors 15 of the flat cable 13 are connected to the respective terminals 21 of the lead block 19, the mutual positions thereof must be correctly determined. The mutual positions are determined by the engagement of the pair of cutout portions 14*a*, 14*a* disposed to the flat cable 13 with the pair of projections 19*a*, 19*a* disposed to the lead block 19. Although the pair of cutout portions 14*a* are formed using the positions of the conductors 15 exposed by themselves as the reference, since the conductors 15 are twisted or separated when they are thin, it is difficult to easily obtain the correct positions to be used as the reference. Thus, there is a problem that the positions of the pair of cutout portions 14*a*, 14*a* cannot be correctly set.

SUMMARY OF THE INVENTION

According to the present invention, the conductors held by the back film of a flat cable is ultrasonic welded to the terminals of an external part.

According to the present invention, the back film is melted by the ultrasonic welding and forms projections higher than the thickness of the conductors to the sides of the conductors.

According to the present invention, there are provided the conductors held by the back film of the flat cable, positioning holes disposed so that a portion of the side edges of the conductors is exposed to the back film and the terminals of an external part and the conductors are connected to the terminals.

According to the present invention, cutout portions are disposed to the side edges of the flat cable using the side edges of the conductors exposed from the positioning holes as a reference, projections are disposed to the external part and the cutout portions are locked to the projections.

DESCRIPTION OF THE PREFERRED EMBODIMENT

Figure 1:
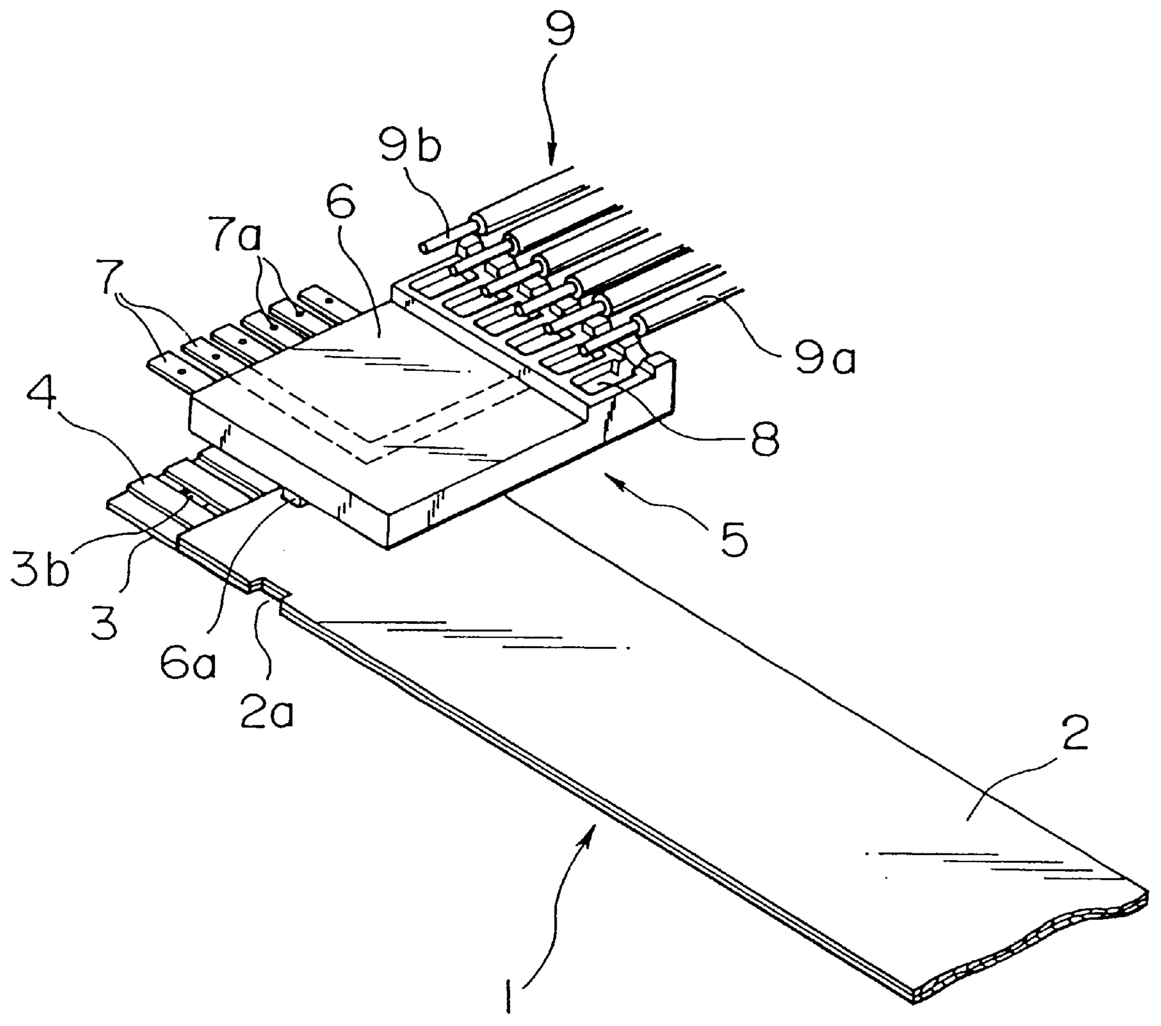
FIG. 1 is an exploded perspective view showing the portion where a flat cable, a lead block and lead wires which show an embodiment of the present invention are connected.
Figure 2:
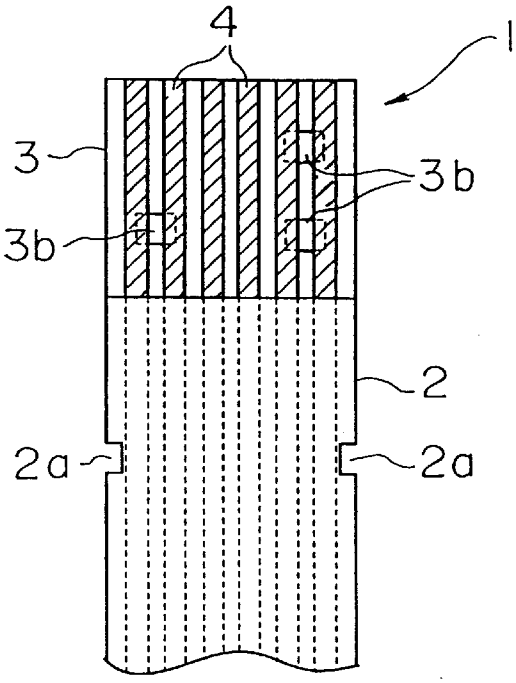
FIG. 2 is an upper plan view showing the flat cable of the present invention.

An embodiment of the present invention will be described with reference to the drawings. FIG. 1 is an exploded perspective view showing the portion where a flat cable, a lead block and lead wires of the present invention are connected, FIG. 2 is an upper plan view showing the flat cable of the present invention and FIG. 3 is a lower plan view showing the flat cable of the present invention.

In FIG. 1, the flat cable 1 is composed of a pair of front film 2 and a back film 3 each composed of PET or the like and having a thickness of about 60 μm and a plurality of conductors 4 composed of a copper foil of about 32 μm thick and embedded in the front and back films 2, 3, and six pieces of the conductors 4 are used in the embodiment. The front film 2 is removed from an end of the flat cable 1 and the plurality of conductors 4 held by the back film 3 are exposed at the end.

Figure 3:
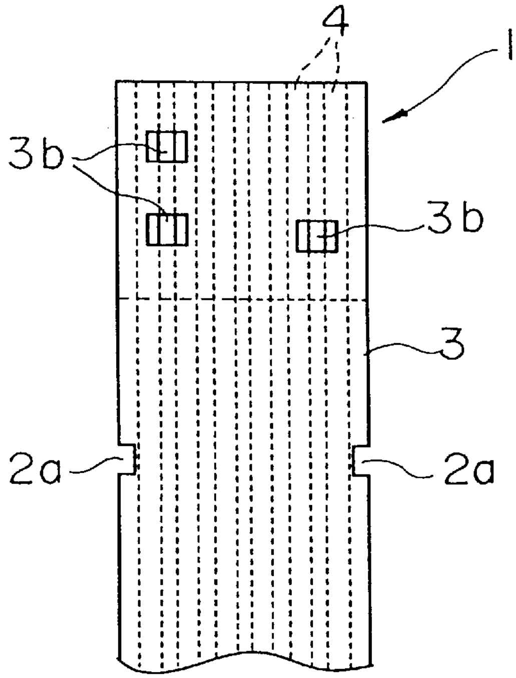
FIG. 3 is a lower plan view showing the flat cable of the present invention.

Further, in FIG. 3, three rectangular positioning holes **3*b* are formed to the back film 3 which holds the conductors 4 exposed at the end of the flat cable 1 so as to stride over the adjacent pair of conductors 4, 4. One of the positioning holes 3*b* is disposed to stride over the respective conductors 4, 4 formed to the right end in the figure and the remaining two holes are disposed to stride over the respective conductors 4, 4 formed to the left end in the figure. Note, the positioning holes 3*b* are not limited to the three pieces but may be two or one piece. In particular, when they are formed obliquely with respect to the lengthwise direction of the flat cable 1, they can accomplish a positioning function in an up and down direction, a right and left direction and a rotational direction. In the embodiment, the three positioning holes 3*b* are disposed and one of them is used as the sensing hole of a position sensor. In addition, a pair of cutout portions 2*a*, 2*a* are disposed to the side edges of the flat cable 1 in the vicinity of the exposed conductors 4 so as to pass through the front and back films 2, 3. The cutout portions 2*a*, 2*a* are locked to a pair of projections 6*a* disposed to the resin molded body 6 of the lead block 5** to be described later.

Figure 6:
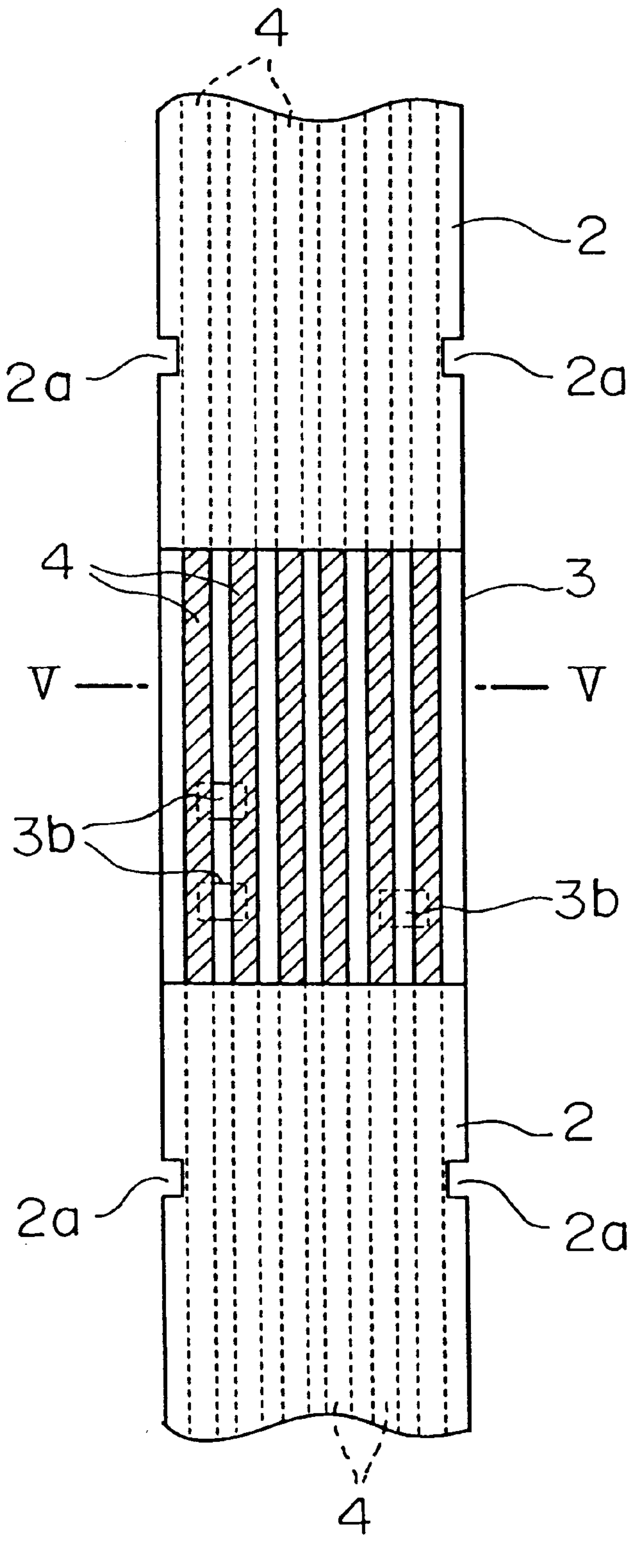
FIG. 6 is a plan view explaining a method of manufacturing the flat cable of the present invention.
Figure 7:
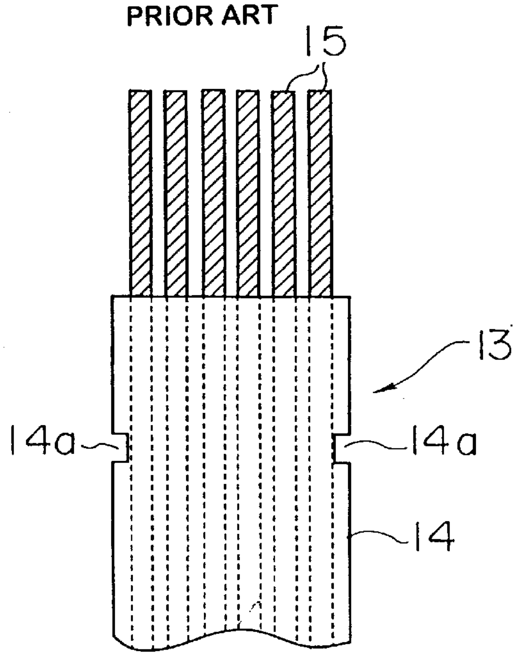
FIG. 7 PRIOR ART
FIG. 7 is a plan view showing a conventional flat cable.
Figure 8:
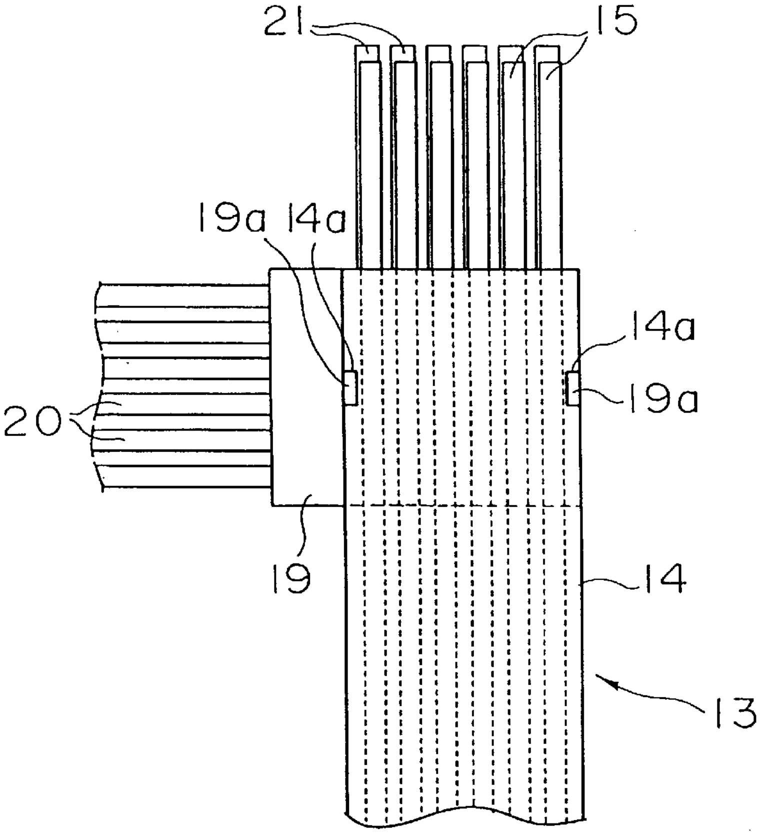
FIG. 8 PRIOR ART
FIG. 8 is a plan view showing the portion where the conventional flat cable, a conventional lead block and controller lead wires are connected.
Figure 9:
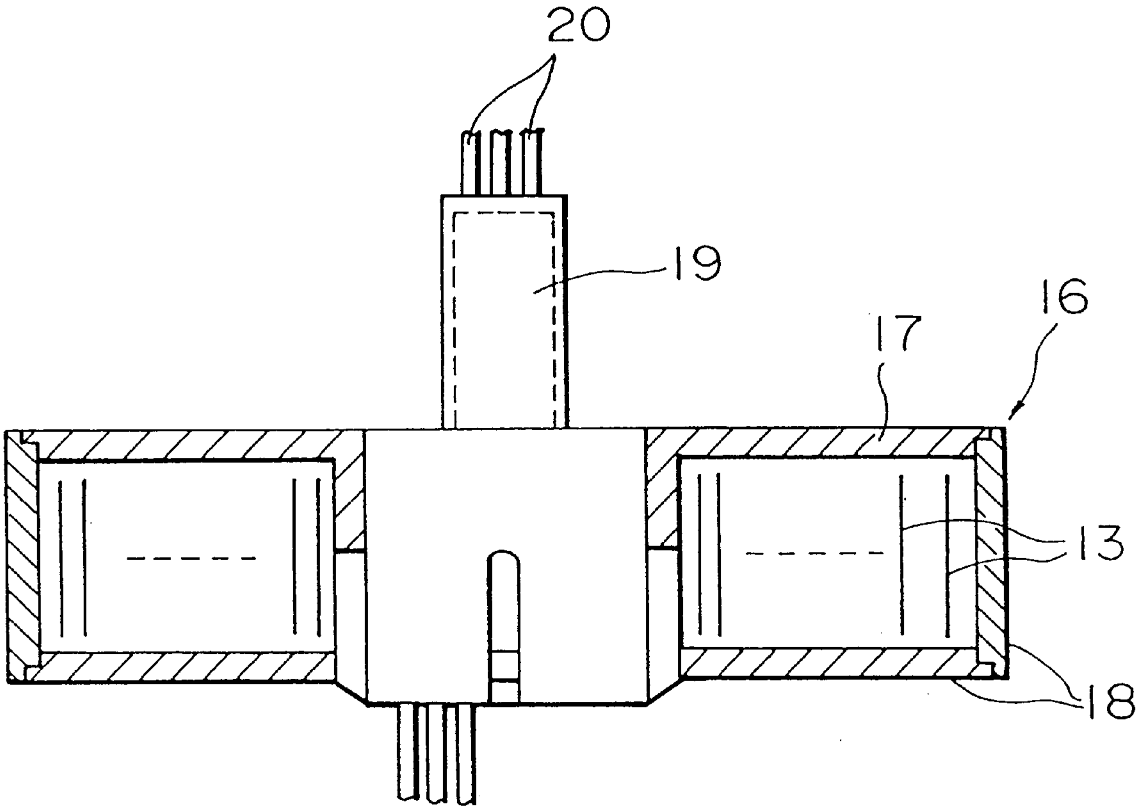
FIG. 9 PRIOR ART
FIG. 9 is a schematic view explaining a conventional rotary connector.

Next, a method of manufacturing the flat cable 1 will be described using the view of FIG. 6 explaining it. First, the back film 3 which has a length of several hundred meters and a predetermined width and is composed of a PET material is prepared and the three positioning holes **3*b* are formed to each of the predetermined positions of the thus prepared back film 3** having intervals of, for example, fifty and several centimeters.

Next, the six long conductors 4 which are as long as the back film 3 to which the positioning holes **3*b* are formed are placed on and bonded to the back film 3 at, for example, equal intervals or at predetermined intervals in the width direction of the back film 3. At the time, the respective two conductors 4 disposed on both the sides of the back film 3 are carried so as to clog a portion of the positioning holes 3*b*. Further, the six conductors 4 are held so that the intervals therebetween are kept with a pinpoint accuracy and the side edges of the respective conductors 4** are disposed with a high positional accuracy each other.

Next, the front films 2 each having a predetermined width which is as long as that of the above back film 3 and a length of about 50 centimeters are sequentially bonded on the long back film 3 to which the six conductors 4 are bonded while providing predetermined intervals of, for example, about 3–5 centimeters therebetween. At the time, the front film 2 are not bonded to the positions where the three positioning holes **3*b* are formed so that the conductors 4** are exposed.

Next, the pair of cutout portions **2*a*, 2*a* are formed by being stamped by a punch (not show) to the side edges of the bonded front and back films 2, 3 in the vicinity of the conductors 4 using the three positioning holes 3*b* formed to the portions of the exposed conductors 4 as reference positions. The stamping formation of them is carried out such that the bonded front and back films 2, 3 are placed on a jig (not shown) and guide pins disposed to the jig are inserted into the two positioning holes 3*b* which are disposed obliquely. At the time, the guide pins are abutted against the side edges of the exposed conductors 4 to thereby determine the mutual positions of the guide pins and the side edges of the conductors 4**.

Note, the remaining positioning hole **3*b*** is used by the position sensor (not shown) such as a light emitting element or the like to confirm the positioning.

The pair of the cutout portions **2*a*, 2*a* are stamped by the above punch which is disposed at the predetermined position from the guide pin using the thus determined positions as references. Therefore, the positions of the cutout portions 2*a*, 2*a* are determined from the side edges of the conductors 4 which are disposed from the positioning holes 3*b* and have an excellent positioning accuracy. Note, since the conductors 4 are held by the back film 3 at the position thereof other than the positioning holes 3*b***, they are difficult to be twisted even if they are composed of the thin copper foil of 32 μm.

Further, the above arrangement permits the cutout portions **2*a*, 2*a* to be formed with a very high positional accuracy with respect to the width and length directions of the flat cable 1**.

Finally, the flat cables 1 each having a length of about fifty and several centimeters and the exposed conductors 4 at both the ends thereof are completed by cutting the portions of the exposed conductors 4, for example, the position shown by a line V–V'.

The lead block 5 shown in FIG. 1 is composed of a plurality of metal plates insert molded into the resin molded body 6 and the one ends the respective metal plates form flat-shaped externally connecting terminals 7 by projecting from a side of the resin molded body 6 and the other ends thereof are bent at right angles to thereby form connecting portions 8 by exposing from the upper surface of one of the sides which are adjacent to the above side. In the embodiment, the six terminals 7 are used in conformity with the respective conductors 4 of the flat cable 1 and the pitch at which the respective terminal 7 are disposed in the insert molding are set so as to coincide with the pitch at which the respective conductors 4 are disposed. In addition, a pair of projections 6*a* which project downward are disposed on the lower surface of the resin molded body 6.

Each of the terminals 7 has a projection 7*a* formed at approximately the center thereof and the projection 7*a* is formed to a suitable shape such as a semi-spherical shape, a slender trapezoidal shape or the like by, for example, a half-punch.

Each of lead wires 9 is composed of an insulator covering portion 9*a* composed of an insulating material and a conductor portion 9*b* composed of a conductor material of a solid wire or a twisted wire which is covered with the insulator covering portion 9*a*. Note, the embodiment includes the six lead wires 9 in conformity with the respective conductors 4 of the flat cable 1.

The respective exposed conductors 4 of the flat cable 1 are connected to the respective terminals 7 of the lead block 5 using an ultrasonic welder to be described later as well as the lead wires 9 are connected to the respective connecting portions 8 of the lead block 5 by spot welding, ultrasonic welding, etc. so that the flat cable 1 is integrated with the respective lead wires 9 through the lead block 5.

Figure 4:
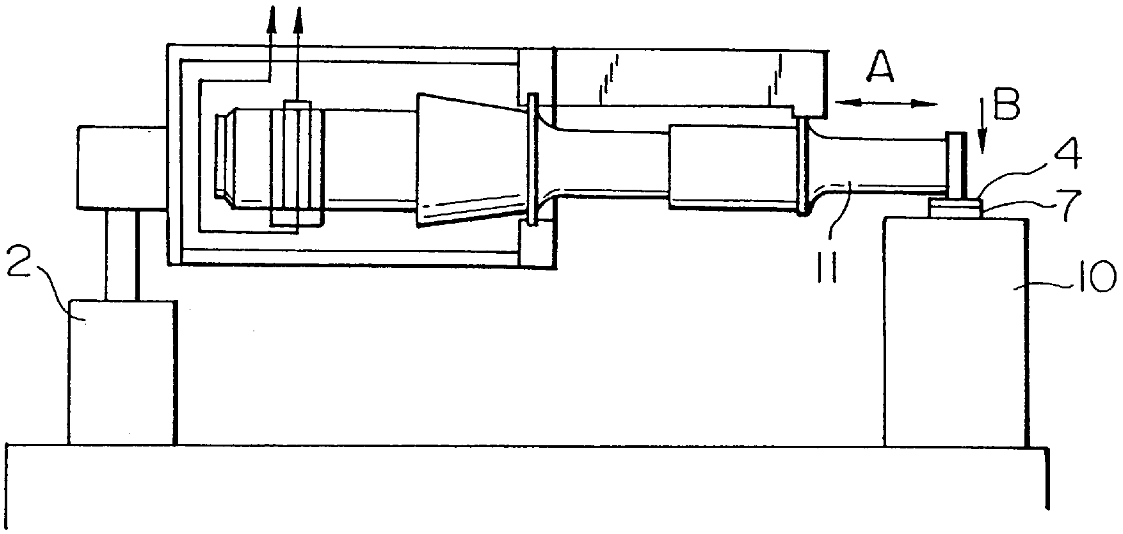
FIG. 4 is a view showing the arrangement of an ultrasonic welder of the present invention.

As shown in FIG. 4, the ultrasonic welder includes an anvil 10 on which a workpiece is placed, a horn 11 for applying ultrasonic vibration to the workpiece in the direction of an arrow A, an air cylinder 12 for applying a press force to the workpiece in the direction of an arrow B by driving the horn 11 and so on.

Saw-tooth-shaped projections 11*a* (refer to FIG. 5) are formed to an end of the horn 11 in conformity with the pitch of the respective conductors 4 of the flat cable 1. Note, in the embodiment, the workpiece is the conductors 4 and the terminal 7. When the conductors 4 are ultrasonic welded to the terminals 7, a plurality of sets of the terminals 7 and the conductors 4 are simultaneously connected in such a manner that the respective terminals 7 of the lead block 5 overlap the respective conductors 4 of the flat cable 1 on the anvil 10 and thereafter the ultrasonic vibration is applied thereto while pressing the overlapped portions of the above terminals 7 and conductors 4 by the projections 11*a* of the horn 11 as shown in the figure to thereby cause the solid-state welding to the respective terminals 7 and the respective conductors 4.

Figure 5:
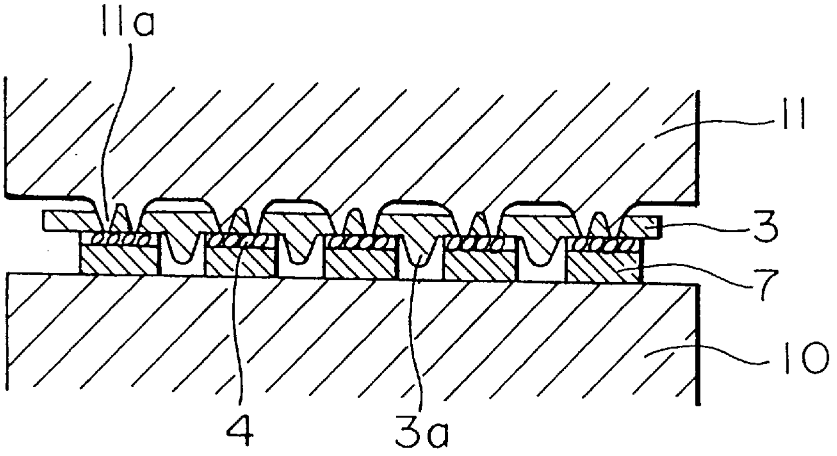
FIG. 5 is a view explaining the state that terminals of the present invention are welded to conductors thereof.

As shown in FIG. 5, the exposed conductors 4 are heated by the ultrasonic vibrations that cause the saw tooth-shaped projections 11*a* to pierce the back film 3 holding the exposed conductors 4. The ultrasonic vibrations melt the back film 3 composed of PET and having a thickness of 60 μm and form projections 3*a* being, for example, about 50 μm high to the sides of the respective conductors 4 among them as if they are walls. The projections 3*a* having the height of about 50 μm are formed among the respective conductors 4, and since they are higher than the thickness of 32 μm of the respective conductors 4, they can prevent the short-circuit among the respective conductors 4 which is caused by the so-called "scatter of metal" when the respective conductors 4 are ultrasonic welded. When the back film 3 of 60 μm thick is ultrasonic welded, the projections 3*a* are formed to the height of about 50–60 μm.

In the connection structure arranged as described above, when the pair of cutout portions 2*a*, 2*a* which are formed to the flat cable 1 with the excellent positional accuracy are locked to the pair of projections 6*a* of the lead block 5, the mutual positions of the conductors 4 of the flat cable 1 and the terminals 7 of the lead block 5 are easily determined.

Although the connection of the terminals 7 of the lead block 5 to the flat cable 1 is described in the embodiment of the present invention, the present invention is also applicable to a housing-integrated rotary connector which is arranged such that it is directly connected to the terminals of an external part such as another connector or the like and the terminals are exposed to the outside from the housing of the rotary connector.

According to the present invention, the conductors held by the back film of the flat cable are ultrasonic welded to the terminals of the external part. Thus, the present invention achieves an advantage that even if the conductors have a very thin thickness of, for example, about 32 μm, since they are the conductors held by the back film, the conductor is not twisted and a plurality of the conductors are not separated from each other, whereby the mutual positions of the terminals and the conductors can be easily determined.

According to the present invention, the back film is melted by the ultrasonic welding and forms the projections higher than the thickness of the conductors to the sides of the conductors. Thus, when the phenomenon of the "scatter of metal" by which the conductors composed of the copper foil is melted by the ultrasonic vibration and the melted copper foil externally scatters arises, the "scatter of metal" does not adversely affect the other conductors by being interrupted by the projections which are higher than the thickness of the conductors, whereby the reliability of the connection of the conductors can be maintained.

The present invention comprises the conductors held by the back film of the flat cable, the positioning holes disposed so that a portion of the side edges of the conductors is exposed to the back film and the terminals of the external part, wherein the conductors are connected to the terminals. Thus, the present invention achieves an advantage that since the side edges of the conductors are exposed from the positioning holes, the conductors can be easily connected to the terminals using the positions of the side edges as the reference.

Further, the present invention disposes the cutout portions to the side edges of the flat cable, disposes the projections to the external part and locks the cutout portions to the projections using the side edges of the conductors exposed from the above positioning holes using the side edges of the conductors exposed from the positioning holes as the reference. Thus, the present invention achieves an advantage that when the cutout portions of the flat cable are locked to the projections of the external part (lead block), the mutual positions of the terminals supported by the external part and the conductors of the flat cable can be caused to correctly correspond to each other, whereby the terminals can be naturally connected to the conductors.

What is claimed is:

1. A connection structure, comprising:

a back film;

a plurality of conductors supported by said back film;

a plurality of terminals, each of said terminals having an ultrasonic weld that welds each of said terminals with one of said plurality of conductors at a position where said conductors are only supported by said back film; and an external part securing said plurality of terminals, said external part being fastened to said back film by a plurality of extensions passing through said back film;

wherein said plurality of conductors and said plurality of terminals each has a predetermined thickness and each is separated by a plurality of longitudinally extending spaces such that the welding of said plurality of terminals with said plurality of conductors align the longitudinally extending spaces of said conductors and said terminals and partially melt said back film into a plurality of projections disposed within said aligned plurality of longitudinally extending spaces, said projections extending above a welded thickness of said conductors.

2. A connection structure, comprising:

a back film having a plurality of positioning holes and a plurality of outside edges, each outside edge having a partially enclosed aperture disposed at an equal distance from an end of said back film;

a plurality of conductors supported by said back film forming a flat cable, said plurality of conductors disposed on said back film such that each partially enclosed aperture exposes at least an edge of one of said plurality of conductors; and a plurality of terminals, each of said terminals having an ultrasonic weld that welds each of said terminals with one of said plurality of conductors at a position where said conductors are supported only by said back film.

3. The connection structure of claim 2, further comprising:

an external part securing said plurality of terminals, said external part being fastened to said back film by a plurality of extensions wherein each extension passes through each partially enclosed aperture and secures said external part to said back film.

4. The connection structure of claim 2, wherein each partially enclosed aperture is substantially boxy being defined by three walls.

* * * * *